(12) United States Patent
Huang

(10) Patent No.: US 10,754,396 B1
(45) Date of Patent: Aug. 25, 2020

(54) TOUCHPAD MODULE AND COMPUTING DEVICE USING SAME

(71) Applicant: PRIMAX ELECTRONICS LTD., Taipei (TW)

(72) Inventor: Tai-Sou Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/578,506

(22) Filed: Sep. 23, 2019

(30) Foreign Application Priority Data

Jun. 14, 2019 (TW) .............................. 108120740 A

(51) Int. Cl.
*G06F 3/0354* (2013.01)
*G06F 1/16* (2006.01)

(52) U.S. Cl.
CPC ............ *G06F 1/169* (2013.01); *G06F 1/1658* (2013.01); *G06F 1/1616* (2013.01)

(58) Field of Classification Search
CPC ...................................................... H05K 5/00
See application file for complete search history.

(56) References Cited

U.S. PATENT DOCUMENTS

| 2011/0018816 A1* | 1/2011 | Liu .......................... G06F 1/169 345/173 |
| 2014/0071050 A1* | 3/2014 | Armstrong-Muntner .................... G06F 3/042 345/158 |

* cited by examiner

*Primary Examiner* — Jerry Wu
(74) *Attorney, Agent, or Firm* — WPAT, PC

(57) ABSTRACT

A touchpad module includes a touch member and an elastic member. The touch member is disposed within a fixing frame of a computing device. The touch member includes a recess. The recess includes a first end and a second end. The elastic member is installed in a casing of the computing device, and includes a first elastic part, a second elastic part and an intermediate part. A portion of the first elastic part and a portion of the second elastic part are extended into the fixing frame, and contacted with the first end and the second end of the recess, respectively. When the touch member is moved from an initial position to a first position in a direction toward a first lateral wall of the fixing frame in response to an external force, the computing device executes a first function.

10 Claims, 8 Drawing Sheets

TOUCHPAD MODULE AND COMPUTING DEVICE USING SAME

FIELD OF THE INVENTION

The present invention relates to an input device, and more particularly to an input device with a touch control function.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling the operations of the electronic device.

FIG. 1 schematically illustrates a conventional notebook computer with a touchpad module. As shown in FIG. 1, the touchpad module 1 is installed in a casing 21 of the notebook computer 2. Moreover, at least a portion of the touchpad module 1 is exposed outside so as to be touched by the user's finger. Consequently, the user may operate the touchpad module 1 to control the notebook computer 2. For example, when the user's finger is placed on the touchpad module 1 and slid on the touchpad module 1, a cursor 23 shown on a display screen 22 of the notebook computer 2 is correspondingly moved. Moreover, when the touchpad module 1 is pressed down by the user's finger, the notebook computer 2 executes a specified function. The use of the touchpad module 1 can implement some functions of the conventional mouse. In other words, the user may operate the notebook computer 2 through the touchpad module 1 without the need of additionally carrying or installing the mouse.

However, since the conventional touchpad module 1 is fixed in the casing 21 of the notebook computer 2 and unable to be moved, some drawbacks occur. For example, the sliding action on the touchpad module 1 has the function of moving the cursor 23 on the display screen 22, and the touchpad module 1 also have the basic functions of the left button and the right button. Except for these functions, the user cannot implement more intuitive operation on the touchpad module 1.

Therefore, there is a need of providing an improved touchpad module in order to overcome the drawbacks of the conventional technologies.

SUMMARY OF THE INVENTION

An object of the present invention provides a touchpad module. The touchpad module is movable relative to a fixing frame of a computing device. According to the moved position of the touch member, the computing device executes a corresponding function.

Another object of the present invention provides computing device with a touchpad module. The touchpad module is movable relative to a fixing frame of a computing device. According to the moved position of the touch member, the computing device executes a corresponding function.

The other objects and advantages of the present invention will be understood from the disclosed technical features.

In accordance with an aspect of the present invention, a touchpad module for a computing device is provided. The computing device includes a casing. A fixing frame is concavely formed in the casing. The touchpad module includes a touch member and an elastic member. The touch member is disposed within the fixing frame. The touch member includes a recess, and the recess includes a first end and a second end, which are opposed to each other. The elastic member is installed in the casing, and includes a first elastic part, a second elastic part and an intermediate part between the first elastic part and the second elastic part. A portion of the first elastic part and a portion of the second elastic part are extended into the fixing frame, and contacted with the first end and the second end of the recess, respectively. When the touch member is moved from an initial position to a first position in a direction toward a first lateral wall of the fixing frame in response to an external force, the computing device executes a first function. While the touch member is moved to the first position, the first elastic part is pushed by the first end of the recess, so that the first elastic part is moved toward the second elastic part.

When the external force is eliminated, the first elastic part is moved away from the second elastic part in response to an elastic restoring force of the elastic member. As the first elastic part is moved, the touch member is correspondingly moved to the initial position in a direction away from the first lateral wall of the fixing frame.

When the touch member is moved from the initial position to a second position in a direction toward a second lateral wall of the fixing frame in response to the external force, the computing device executes a second function. While the touch member is moved to the second position, the second elastic part is pushed by the second end of the recess, so that the second elastic part is moved toward the first elastic part. The second lateral wall and the first lateral wall of the fixing frame are opposed to each other.

In an embodiment, the touch member has a first lateral side and a second lateral side, which are opposed to each other. When the touch member is in the initial position, there is a first gap between the first lateral side of the touch member and the first lateral wall of the fixing frame, and there is a second gap between the second lateral side of the touch member and the second lateral wall of the fixing frame. When the touch member is in the first position, there is a third gap between the first lateral side of the touch member and the first lateral wall of the fixing frame. When the touch member is in the second position, there is a fourth gap between the second lateral side of the touch member and the second lateral wall of the fixing frame. A length of the first gap is equal to a length of the second gap. The length of the first gap is larger than a length of the third gap. The length of the second gap is larger than a length of the fourth gap.

In an embodiment, the touch member further includes at least one first light-emitting element and at least one second light-emitting element. The at least one first light-emitting element is located beside the first lateral wall of the fixing frame. The at least one second light-emitting element is located beside the second lateral wall of the fixing frame. When the touch member is moved from the initial position to the first position, the at least one first light-emitting element emits light beams to the third gap. When the touch member is moved from the initial position to the second position, the at least one second light-emitting element emits the light beams to the fourth gap.

In an embodiment, the touch member further includes the top cover, a circuit board and a supporting element. The top cover is partially exposed outside the fixing frame. The supporting element is arranged between the fixing frame and the circuit board. The circuit board is arranged between the top cover and the supporting element. The recess is concavely formed in a surface of the supporting element that faces the elastic member. The at least one first light-emitting element and the at least one second light-emitting elements are disposed on a surface of the circuit board that faces the fixing frame.

In an embodiment, the touch member further includes at least one fixing hole and at least one fastening element, and the at least one fixing hole runs through the supporting element. The computing device further includes at least one position-limiting hole. The at least one position-limiting hole runs through the fixing frame and is aligned with the corresponding fixing hole. The fastening element is penetrated through the corresponding position-limiting hole and tightened into the corresponding fixing hole of the supporting element.

In an embodiment, the position-limiting hole includes a first stopping end and a second stopping end, which are opposed to each other. When the touch member is moved from the initial position to the first position, the fastening element is moved with the supporting element so as to be contacted with the second stopping end of the position-limiting hole. When the touch member is moved from the initial position to the second position, the fastening element is moved with the supporting element so as to be contacted with the first stopping end of the position-limiting hole.

In an embodiment, the first elastic part, the second elastic part and intermediate part of the elastic member are connected with each other to form an inverted U-shaped structure. The computing device further includes a protrusion post. The protrusion post is protruded from the casing. The protrusion post is enclosed by the first elastic part, the second elastic part and the intermediate part of the elastic member.

In accordance with another aspect of the present invention, a computing device is provided. The computing device includes a casing, a processor and a touchpad module. A fixing frame is concavely formed in the casing. The processor is disposed within the casing. The touchpad module is disposed within the casing and electrically connected with the processor. The touchpad module includes a touch member and an elastic member. The touch member is disposed within the fixing frame. The touch member includes a recess, and the recess includes a first end and a second end, which are opposed to each other. The elastic member is installed in the casing, and includes a first elastic part, a second elastic part and an intermediate part between the first elastic part and the second elastic part. A portion of the first elastic part and a portion of the second elastic part are extended into the fixing frame, and contacted with the first end and the second end of the recess, respectively. When the touch member is moved from an initial position to a first position in a direction toward a first lateral wall of the fixing frame in response to an external force, the computing device executes a first function. While the touch member is moved to the first position, the first elastic part is pushed by the first end of the recess, so that the first elastic part is moved toward the second elastic part.

From the above descriptions, the present invention provides the touchpad module. In addition to the original functions of the left button, the right button and the scroll wheel, the touch member of the touchpad module can be moved relative to the fixing frame of the computing device. According to the moved position of the touch member, the computing device executes a corresponding function. When the touch member is moved from the initial position to the first position, the computing device executes the first function (e.g., the function of swiping the web page to the previous page). When the touch member is moved from the initial position to the second position, the computing device executes the second function (e.g., the function of swiping the web page to the next page). After the touch member is moved relative to the fixing frame and positioned, the light-emitting element of the touch member emits light beams to prompt the user. When the touch member is not moved and the external force is eliminated, the touch member is restored to the original position in response to the elastic restoring force of the elastic member. Moreover, the function to be executed by the computing device and corresponding to the movement of the touch member may be defined by the user. For example, the function includes the function of adjusting the level of the sound volume, the function of adjusting the brightness value of the display screen or the function of enabling the e-mail box. Due to this structural design, the operation of the touchpad module can provide more functions. Consequently, the touchpad module is more user-friendly.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
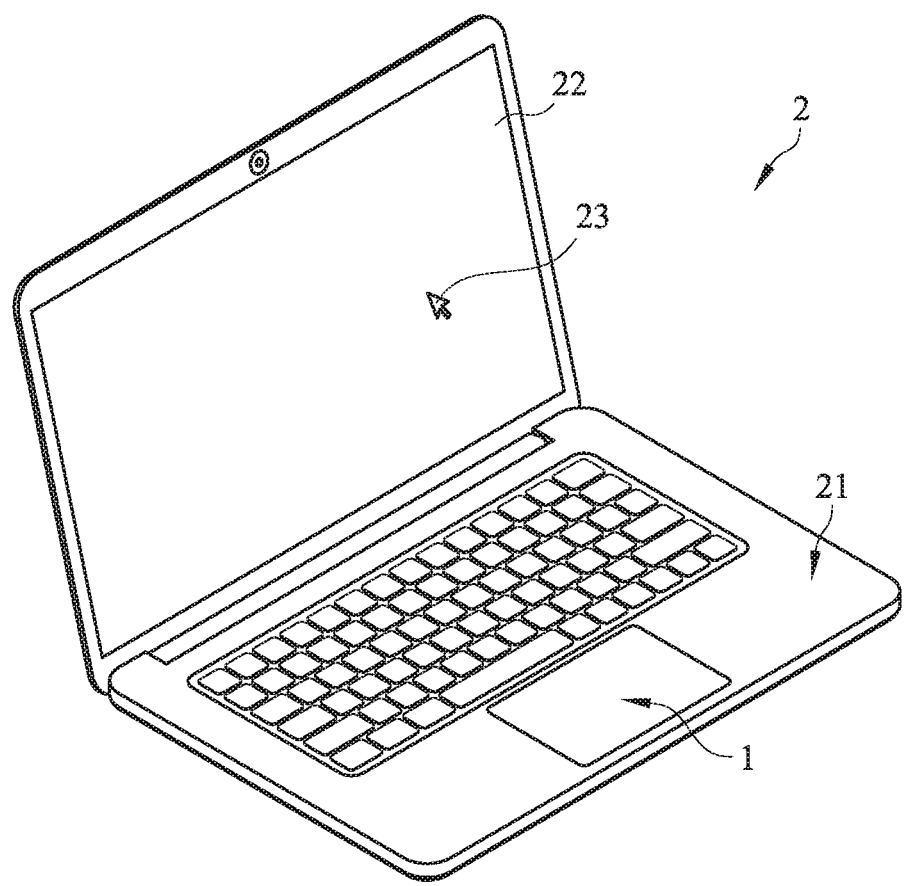
FIG. 1 schematically illustrates a conventional notebook computer with a touchpad module.
Figure 2:
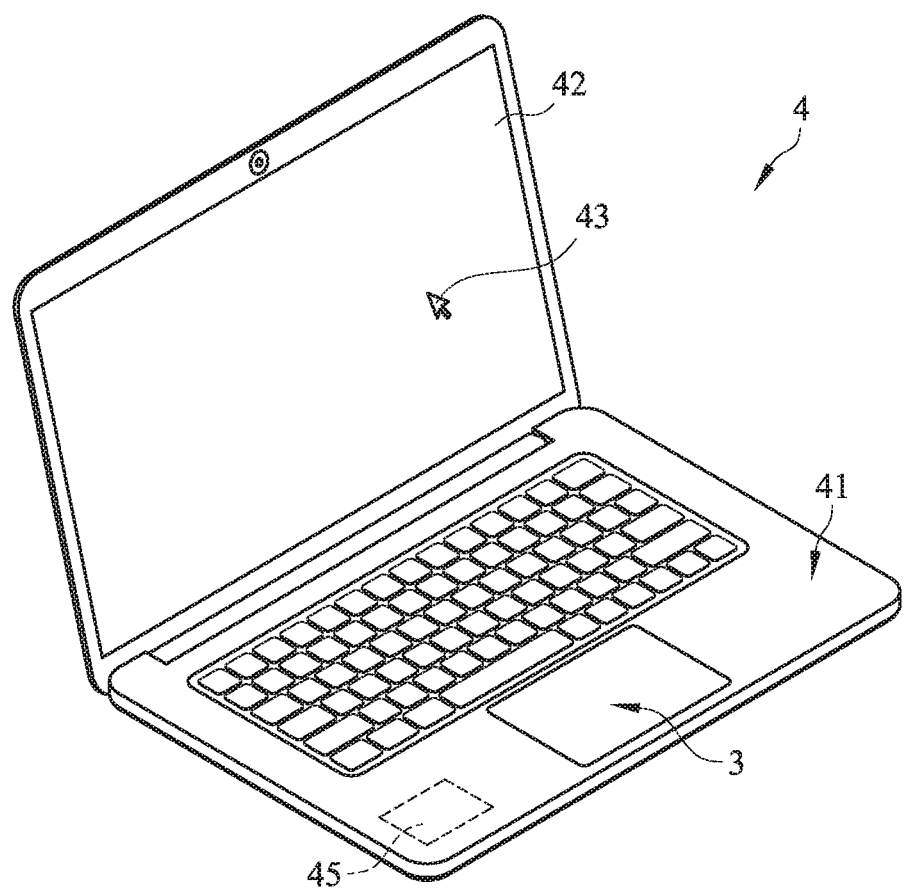
FIG. 2 is a schematic perspective view illustrating the outer appearance of a computing device with a touchpad module according to an embodiment of the present invention.

FIG. 2 is a schematic perspective view illustrating the outer appearance of a computing device with a touchpad module according to an embodiment of the present invention. An example of the computing device 4 includes but is not limited to a notebook computer. In an embodiment, the computing device 4 comprises a casing 41, a display screen 42, a processor 45 and a touchpad module 3. The processor 45 is disposed within the casing 41. Moreover, the processor 41 is used for processing electronic signals of the computing device 4. A fixing frame 44 is concavely formed in the casing 41 (see FIGS. 3-8). The touchpad module 3 is disposed within the fixing frame 44 and electrically connected with the processor 45. In addition, at least a portion of the touchpad module 3 is exposed outside so as to be touched by the user's finger. Consequently, the user may operate the touchpad module 3 to control the computing device 4. For example, when the user's finger is placed on the touchpad module 3 and slid on the touchpad module 3, a cursor 43 shown on the display screen 42 is correspondingly moved. Moreover, when the touchpad module 3 is pressed by the user's finger, the computing device 4 executes a specified function.

The other structure of the touchpad module 3 will be described in more details as follows.

Figure 3:
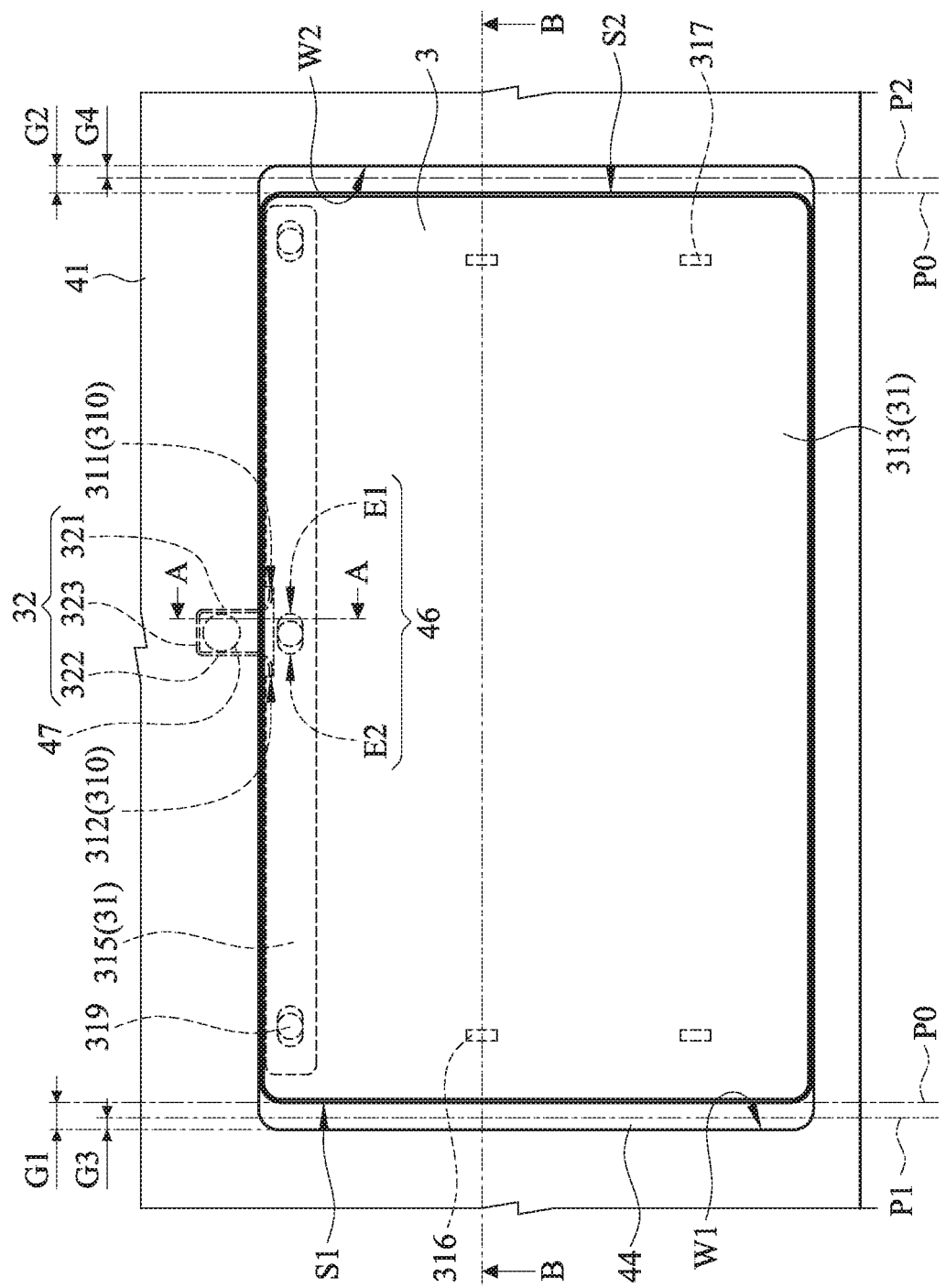
FIG. 3 is a schematic top view illustrating a portion of the computing device as shown in FIG. 2.
Figure 4:
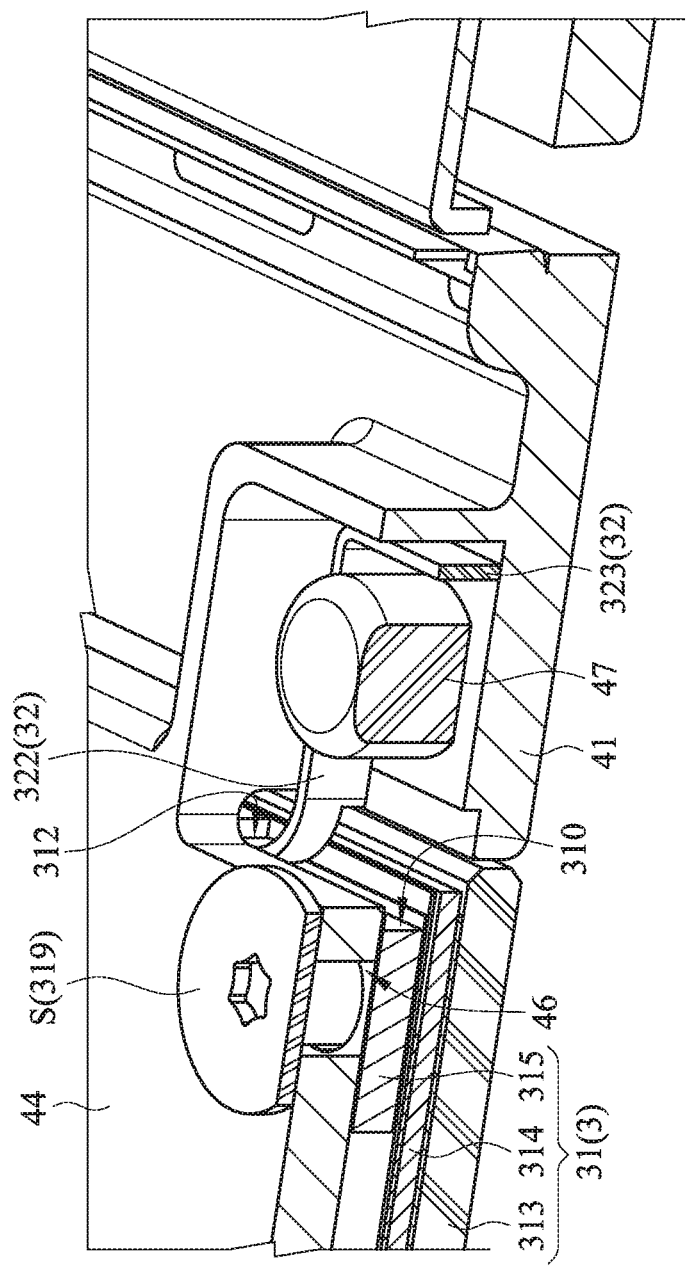
FIG. 4 is a schematic cutaway view illustrating the computing device as shown in FIG. 3 and taken along the line AA.
Figure 5:
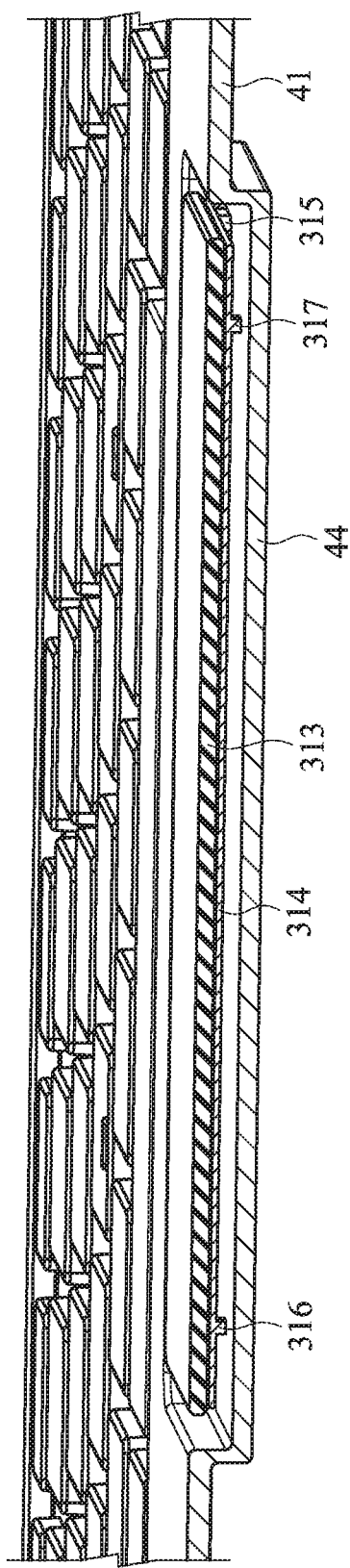
FIG. 5 is a schematic cutaway view illustrating the computing device as shown in FIG. 3 and taken along the line BB.
Figure 6:
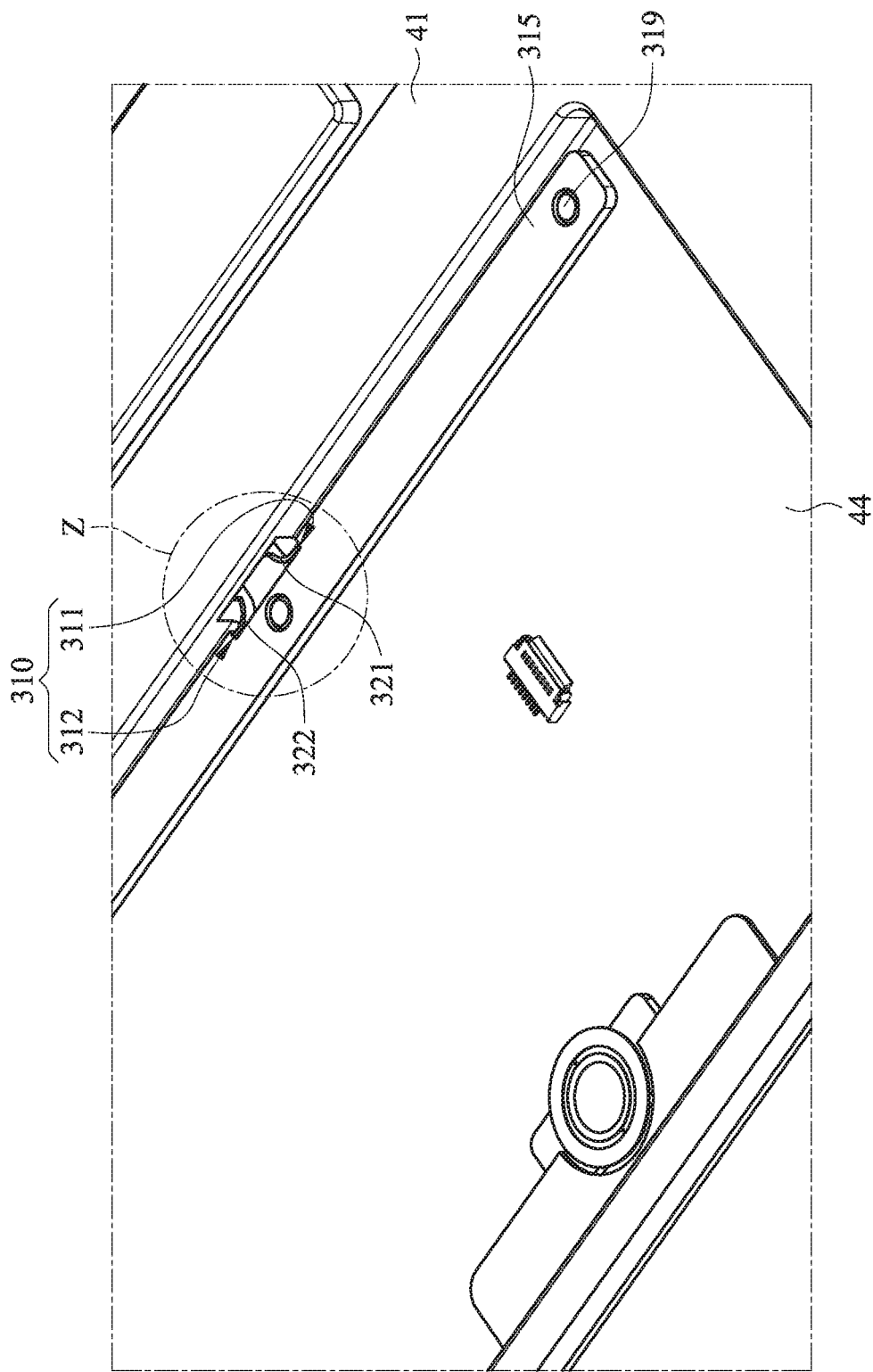
FIG. 6 schematically illustrates the connection between the touch member and the elastic member of the computing device as shown in FIG. 3.
Figure 7:
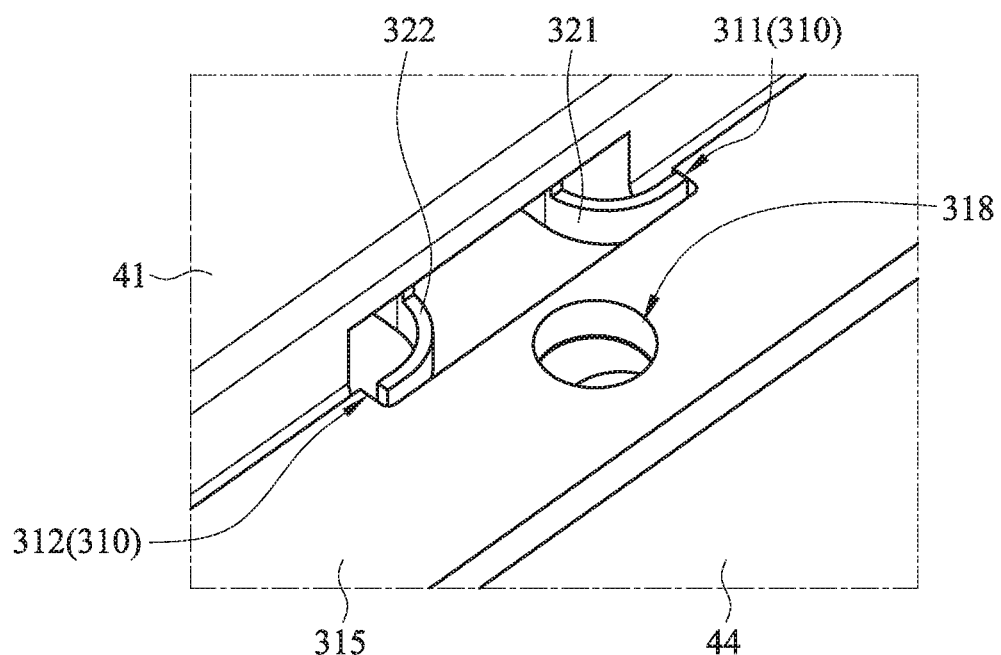
FIG. 7 is a schematic top view illustrating the enlarged portion of the region Z as shown in FIG. 6.
Figure 8:
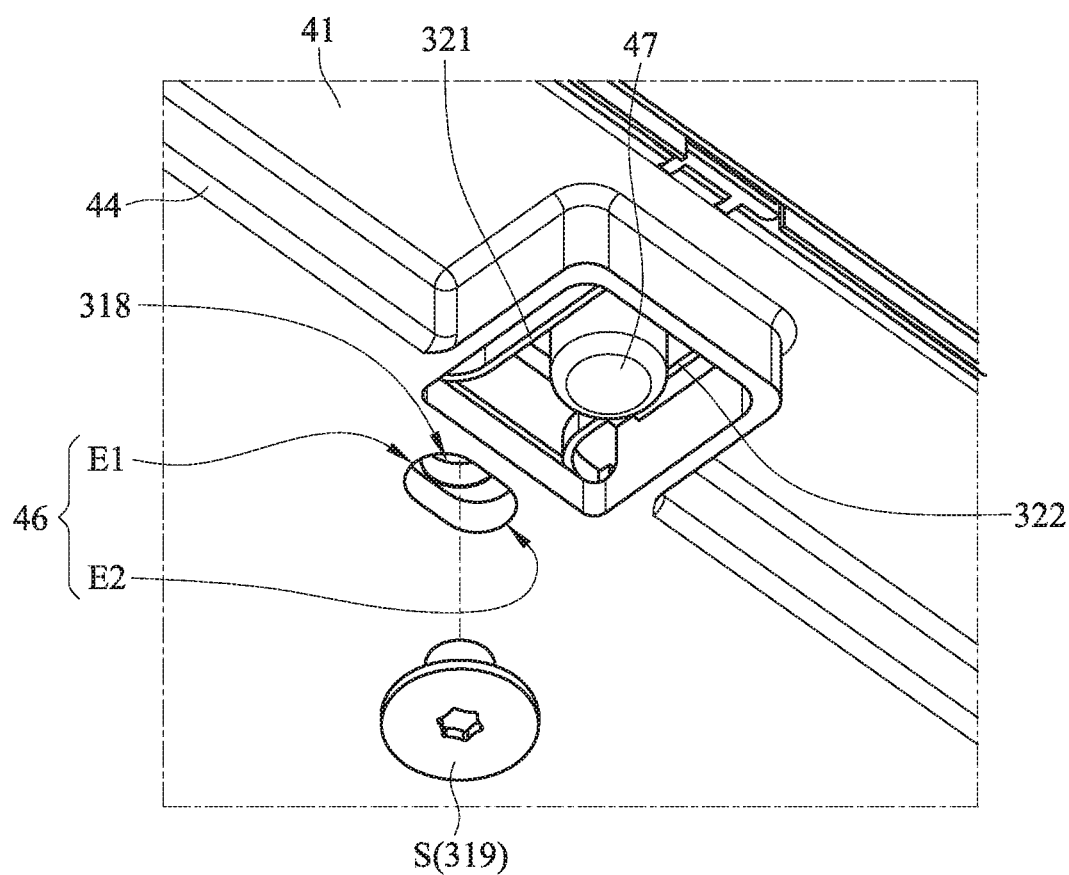
FIG. 8 is a schematic bottom view illustrating the enlarged portion of the region Z as shown in FIG. 6.

Please refer to FIGS. 3, 4, 5, 6, 7 and 8. FIG. 3 is a schematic top view illustrating a portion of the computing device as shown in FIG. 2. FIG. 4 is a schematic cutaway view illustrating the computing device as shown in FIG. 3 and taken along the line AA. FIG. 5 is a schematic cutaway view illustrating the computing device as shown in FIG. 3 and taken along the line BB. FIG. 6 schematically illustrates the connection between the touch member and the elastic member of the computing device as shown in FIG. 3. FIG. 7 is a schematic top view illustrating the enlarged portion of the region Z as shown in FIG. 6. FIG. 8 is a schematic bottom view illustrating the enlarged portion of the region Z as shown in FIG. 6. For illustration, a top cover 313 and a circuit board 314 are not shown in FIG. 6.

Please refer to FIGS. 3, 4, 5, 6, 7 and 8 again. In an embodiment, the touchpad module 3 comprises a touch member 31 and an elastic member 32. The touch member 31 is disposed within the fixing frame 44. The touch member 31 has a recess 310. The recess 310 has a first end 311 and a second end 312. The elastic member 32 is installed in the fixing frame 44 of the computing device 4. The elastic member 32 comprises a first elastic part 321, a second elastic part 322 and an intermediate part 323. The intermediate part 323 is connected between the first elastic part 321 and the second elastic part 322. In this embodiment, the intermediate part 323 is connected with an end of the first elastic part 321 and an end of the second elastic part 322, so that an inverted U-shaped structure is formed. A portion of the first elastic part 321 and a portion of the second elastic part 322 are extended into the fixing frame 44 and contacted with the inner wall of the recess 310. Particularly, the portion of the first elastic part 321 and the portion of the second elastic part 322 are contacted with the first end 311 and the second end 312 of the recess 310, respectively.

In accordance with a feature of the present invention, the touchpad module 3 is movable relative to the fixing frame 44 of the computing device 4. In an embodiment, the touchpad module 3 is movable in a left direction or a right direction. It is noted that the way of moving the touchpad module 3 is not restricted. For example, in another embodiment, the touchpad module 3 is movable in an upward direction or a downward direction. While the touchpad module 3 is moved relative to the fixing frame 44 in the left direction, the touchpad module 3 issues a first command. According to the first command, the processor 45 (see FIG. 2) of the computing device 4 executes a first function. While the touchpad module 3 is moved relative to the fixing frame 44 in the right direction, the touchpad module 3 issues a second command. According to the second command, the processor 45 (see FIG. 2) of the computing device 4 executes a second function. The action of moving the touchpad module 3 relative to the fixing frame 44 will be described as follows.

Please refer to FIGS. 3, 4, 5, 6, 7 and 8 again. The touch member 31 further comprises the top cover 313, the circuit board 314 and a supporting element 315. The top cover 313 is partially exposed outside the fixing frame 44 of the computing device 4 so as to be touched by the user's finger. The circuit board 314 is arranged between the top cover 313 and the supporting element 315. The supporting element 315 is arranged between the fixing frame 44 and the circuit board 314. The recess 310 is concavely formed in a first surface of the supporting element 315, wherein the first surface of the supporting element 315 faces the elastic member 32.

Please refer to FIGS. 3, 4 and 5. The touch member 31 further comprises at least one first light-emitting element 316 and at least one second light-emitting element 317. In this embodiment, the touch member 31 comprises two first light-emitting elements 316 and two second light-emitting elements 317. It is noted that the numbers of the at least one first light-emitting element 316 and the at least one second light-emitting elements 317 may be varied according to the practical requirements. The at least one first light-emitting element 316 and the at least one second light-emitting elements 317 are disposed on a first surface of the circuit board 314, wherein the first surface of the circuit board 314 faces the fixing frame 44. The at least one first light-emitting element 316 is located beside a first lateral wall W1 of the fixing frame 44. The at least one second light-emitting elements 317 is located beside a second lateral wall W2 of the fixing frame 44. According to the position of the touchpad module 3 relative to the fixing frame 44, the at least one first light-emitting element 316 and the at least one second light-emitting elements 317 is selectively enabled to emit light beams.

Please refer to FIGS. 4, 5, 6, 7 and 8. The touch member 31 further comprises at least one fixing hole 318 and at least one fastening element 319. The at least one fixing hole 318 runs through the supporting element 315. Moreover, the computing device 4 further comprises at least one position-limiting hole 46. The at least one position-limiting hole 46 runs through the fixing frame 44. The position-limiting hole 46 of the fixing frame 44 is aligned with the corresponding fixing hole 318 in the supporting element 315. The fastening element 319 is penetrated through the position-limiting hole 46 and tightened into the corresponding fixing hole 318 in the supporting element 315. Consequently, the touch member 31 and the fixing frame 44 are combined together. Especially, when the fastening element 319 is penetrated through the position-limiting hole 46 and tightened into the corresponding fixing hole 318 in the supporting element 315, a head part S of the fastening element 319 is contacted with the fixing frame 44. Consequently, the touch member 31 is fixed on the fixing frame 44. However, the fastening element 319 is not completely tightened into the corresponding fixing hole 318. That is, the fixing frame 44 is fixed between the head part S of the fastening element 319 and the touch member 31 only. Consequently, the touch member 31 is still movable relative to the fixing frame 44 in the left direction or the right direction. In this embodiment, the position-limiting hole 46 comprises a first stopping end E1 and a second stopping end E2, which are opposed to each other. Due to the cooperation of the first stopping end E1 of the position-limiting hole 46, the second stopping end E2 of the position-limiting hole 46 and the corresponding fastening element 319, the movable distance of the touch member 31 relative to the fixing frame 44 is limited. In this embodiment, the touch member 31 comprises three fixing holes 318 and three fastening elements 319, and the computing device 4 comprises three position-limiting holes 46. It is noted that the numbers of the at least one fixing hole 318, at least one fastening element 319 and the at least one position-limiting hole 46 may be varied according to the practical requirements.

Please refer to FIG. 4 and FIG. 8. In an embodiment, the computing device 4 further comprises a protrusion post 47. The protrusion post 47 is protruded from the casing 41. Preferably but not exclusively, the protrusion post 47 has a cylindrical structure. The protrusion post 47 is protruded from the casing 41 is enclosed by the first elastic part 321, the second elastic part 322 and the intermediate part 323 of the elastic member 32. In response to the elastic restoring force of the elastic member 32, the first elastic part 321 and the second elastic part 322 are contacted with two opposite sides of the protrusion post 47. Consequently, the elastic member 32 is fixed on the casing 41 of the computing device 4.

Please refer to FIGS. 3, 4, 5, 6, 7 and 8 again. When the user applies a pushing force to the touchpad module 3 in the left direction, the touch member 31 is moved from an initial position P0 to a first position P1 in the direction toward the first lateral wall W1 of the fixing frame 44. That is, the touch member 31 is moved in the left direction and moved to the first position P1. Meanwhile, the touch member 31 issues the first command. According to the first command, the computing device 4 executes the first function. While the touch member 31 is moved toward the first position P1, the first elastic part 321 of the elastic member 32 is pushed by the first end 311 of the recess 310. Consequently, the first elastic part 321 of the elastic member 32 is moved in the direction toward the second elastic part 322 of the elastic member 32. Especially, after the first elastic part 321 of the elastic member 32 is pushed by the first end 311 of the recess 310, the first elastic part 321 of the elastic member 32 is subjected to a curvy deformation and moved toward the second elastic part 322 of the elastic member 32 by using the junction between the first elastic part 321 of the elastic member 32 and the protrusion post 47 as a fulcrum.

When the pushing force applied to the touchpad module 3 is eliminated, the first elastic part 321 of the elastic member 32 is moved in the direction away from the second elastic part 322 of the elastic member 32 in response to the elastic restoring force of the elastic member 32. As the first elastic part 321 of the elastic member 32 is moved, the touch member 31 is moved from the first position P1 to the initial position P0 in the direction away from the first lateral wall W1 of the fixing frame 44.

Similarly, when the user applies the pushing force to the touchpad module 3 in the right direction, the touch member 31 is moved from the initial position P0 to a second position P2 in the direction toward the second lateral wall W2 of the fixing frame 44. The second lateral wall W2 is opposed to the first lateral wall W1. That is, the touch member 31 is moved in the right direction and moved to the second position P2. Meanwhile, the touch member 31 issues the second command. According to the second command, the computing device 4 executes the second function. While the touch member 31 is moved toward the second position P2, the second elastic part 322 of the elastic member 32 is pushed by the second end 312 of the recess 310. Consequently, the second elastic part 322 of the elastic member 32 is moved in the direction toward the first elastic part 321 of the elastic member 32. That is, the second elastic part 322 of the elastic member 32 is subjected to a curvy deformation and moved toward the first elastic part 321 of the elastic member 32 by using the junction between the second elastic part 322 of the elastic member 32 and the protrusion post 47 as the fulcrum.

Some examples of the first function and the second function will be described as follows. For example, when the touch member 31 is moved to the first position P1 in the left direction, the first function executed by the computing device 4 is the function of swiping the web page of an application program (e.g., a browser) to the previous page. When the touch member 31 is moved to the second position P2 in the right direction, the second function executed by the computing device 4 is the function of swiping the web page of the application program (e.g., the browser) to the next page.

It is noted that the examples of the first function and the second function executed by the computing device 4 are not restricted. For example, when the touch member 31 is moved to the first position P1 in the left direction, the first function executed by the computing device 4 is the function of decreasing the sound volume. When the touch member 31 is moved to the second position P2 in the right direction, the second function executed by the computing device 4 is the function of increasing the sound volume.

Alternatively, when the touch member 31 is moved to the first position P1 in the left direction, the first function executed by the computing device 4 is the function of decreasing the brightness value of the display screen. When the touch member 31 is moved to the second position P2 in the right direction, the second function executed by the computing device 4 is the function of increasing the brightness value of the display screen.

Alternatively, when the touch member 31 is moved to the first position P1 in the left direction, the first function executed by the computing device 4 is the function of turning the computing device 4. When the touch member 31 is moved to the second position P2 in the right direction, the second function executed by the computing device 4 is the function of enabling the e-mail box.

Please refer to FIG. 3 again. The touch member 31 has a first lateral side S1 and a second lateral side S2, which are opposed to each other. When the touch member 31 is in the initial position P0, there is a first gap G1 between the first lateral side S1 of the touch member 31 and the first lateral wall W1 of the fixing frame 44 and there is a second gap G2 between the second lateral side S2 of the touch member 31 and the second lateral wall W2 of the fixing frame 44. When the touch member 31 is in the first position P1, there is a third gap G3 between the first lateral side S1 of the touch member 31 and the first lateral wall W1 of the fixing frame 44. When the touch member 31 is in the second position P2, there is a fourth gap G4 between the second lateral side S2 of the touch member 31 and the second lateral wall W2 of the fixing frame 44. The length of the first gap G1 is equal to the length of the second gap G2. The length of the first gap G1 is larger than the length of the third gap G3. The length of the second gap G2 is larger than the length of the fourth gap G4.

Please refer to FIG. 3 again. When the touch member 31 is moved from the initial position P0 to the first position P1, the at least one first light-emitting element 316 that is installed on the circuit board 314 and located beside the first lateral wall W1 of the fixing frame 44 emits light beams to the third gap G3 and illuminates the third gap G3. The light beams can prompt the user that the touch member 31 has issued the first command and the computing device 4 starts to execute the first function. When the touch member 31 is moved from the initial position P0 to the second position P2, the at least one second light-emitting elements 317 that is installed on the circuit board 314 and located beside a second lateral wall W2 of the fixing frame 44 emits light beams to the fourth gap G4 and illuminates the fourth gap G4. The light beams can prompt the user that the touch member 31 has issued the second command and the computing device 4 starts to execute the second function.

Please refer to FIG. 3 again. While the touch member 31 is moved from the initial position P0 to the first position P1, the fastening element 319 is moved with the supporting element 315 of touch member 31. When the fastening element 319 is contacted with the second stopping end E2 of the position-limiting hole 46, the touch member 31 cannot be continuously moved in the left direction. Consequently, the touch member 31 is stopped at the first position P1. Similarly, while the touch member 31 is moved from the initial position P0 to the second position P2, the fastening element 319 is moved with the supporting element 315 of touch member 31. When the fastening element 319 is contacted with the first stopping end E1 of the position-limiting hole 46, the touch member 31 cannot be continuously moved in the right direction. Consequently, the touch member 31 is stopped at the second position P2.

From the above descriptions, the present invention provides the touchpad module. In addition to the original functions of the left button, the right button and the scroll wheel, the touch member of the touchpad module can be moved relative to the fixing frame of the computing device. According to the moved position of the touch member, the computing device executes a corresponding function. When the touch member is moved from the initial position to the first position, the computing device executes the first function (e.g., the function of swiping the web page to the previous page). When the touch member is moved from the initial position to the second position, the computing device executes the second function (e.g., the function of swiping the web page to the next page). After the touch member is moved relative to the fixing frame and positioned, the light-emitting element of the touch member emits light beams to prompt the user. When the touch member is not moved and the external force is eliminated, the touch member is restored to the original position in response to the elastic restoring force of the elastic member. Moreover, the function to be executed by the computing device and corresponding to the movement of the touch member may be defined by the user. For example, the function includes the function of adjusting the level of the sound volume, the function of adjusting the brightness value of the display screen or the function of enabling the e-mail box. Due to this structural design, the operation of the touchpad module can provide more functions. Consequently, the touchpad module is more user-friendly.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module for a computing device, the computing device comprising a casing, a fixing frame being concavely formed in the casing, the touchpad module comprising: a touch member disposed within an opening formed by a first lateral wall, an opposite second lateral wall, and side lateral walls of the fixing frame, wherein the touch member comprises a recess, and the recess comprises a first end and a second end, which are opposed to each other; and an elastic member installed in the casing, and comprising a first elastic part, a second elastic part and an intermediate part between the first elastic part and the second elastic part, wherein a portion of the first elastic part and a portion of the second elastic part are extended into one of the side lateral walls of the fixing frame, and contacted with the first end and the second end of the recess, respectively, wherein when the touch member is moved from an initial position to a first position in a direction toward a first lateral wall of the fixing frame in response to an external force, the computing device executes a first function, wherein while the touch member is moved to the first position, the first elastic part is pushed by the first end of the recess, so that the first elastic part is moved toward the second elastic part.

2. The touchpad module according to claim 1, wherein when the external force is eliminated, the first elastic part is moved away from the second elastic part in response to an elastic restoring force of the elastic member, wherein as the first elastic part is moved, the touch member is correspondingly moved to the initial position in a direction away from the first lateral wall of the fixing frame.

3. The touchpad module according to claim 1, wherein when the touch member is moved from the initial position to a second position in a direction toward a second lateral wall of the fixing frame in response to the external force, the computing device executes a second function, wherein while the touch member is moved to the second position, the second elastic part is pushed by the second end of the recess, so that the second elastic part is moved toward the first elastic part, wherein the second lateral wall and the first lateral wall of the fixing frame are opposed to each other.

4. The touchpad module according to claim 3, wherein the touch member has a first lateral side and a second lateral side, which are opposed to each other, wherein when the touch member is in the initial position, there is a first gap between the first lateral side of the touch member and the first lateral wall of the fixing frame, and there is a second gap between the second lateral side of the touch member and the second lateral wall of the fixing frame, wherein when the touch member is in the first position, there is a third gap between the first lateral side of the touch member and the first lateral wall of the fixing frame, wherein when the touch member is in the second position, there is a fourth gap between the second lateral side of the touch member and the second lateral wall of the fixing frame, wherein a length of the first gap is equal to a length of the second gap, the length of the first gap is larger than a length of the third gap, and the length of the second gap is larger than a length of the fourth gap.

5. The touchpad module according to claim 4, wherein the touch member further comprises:
  at least one first light-emitting element located beside the first lateral wall of the fixing frame; and
  at least one second light-emitting element located beside the second lateral wall of the fixing frame,
  wherein when the touch member is moved from the initial position to the first position, the at least one first light-emitting element emits light beams to the third gap,
  wherein when the touch member is moved from the initial position to the second position, the at least one second light-emitting element emits the light beams to the fourth gap.

6. The touchpad module according to claim 5, wherein the touch member further comprises the top cover, a circuit board and a supporting element, wherein the top cover is partially exposed outside the fixing frame, the supporting element is arranged between the fixing frame and the circuit board, and the circuit board is arranged between the top cover and the supporting element, wherein the recess is concavely formed in a surface of the supporting element that faces the elastic member, and the at least one first light-emitting element and the at least one second light-emitting elements are disposed on a surface of the circuit board that faces the fixing frame.

7. The touchpad module according to claim 6, wherein the touch member further comprises at least one fixing hole and at least one fastening element, and the at least one fixing hole runs through the supporting element, wherein the computing device further comprises at least one position-limiting hole, and the at least one position-limiting hole runs through the fixing frame and is aligned with the corresponding fixing hole, wherein the fastening element is penetrated through the corresponding position-limiting hole and tightened into the corresponding fixing hole of the supporting element.

8. The touchpad module according to claim 7, wherein the position-limiting hole comprises a first stopping end and a second stopping end, which are opposed to each other, wherein when the touch member is moved from the initial position to the first position, the fastening element is moved with the supporting element so as to be contacted with the second stopping end of the position-limiting hole, wherein when the touch member is moved from the initial position to the second position, the fastening element is moved with the supporting element so as to be contacted with the first stopping end of the position-limiting hole.

9. The touchpad module according to claim 1, wherein the first elastic part, the second elastic part and intermediate part of the elastic member are connected with each other to form an inverted U-shaped structure, wherein the computing device further comprises a protrusion post, and the protrusion post is protruded from the casing, wherein the protrusion post is enclosed by the first elastic part, the second elastic part and the intermediate part of the elastic member.

10. A computing device, comprising: a casing, wherein a fixing frame is concavely formed in the casing; a processor disposed within the casing; and a touchpad module disposed within the casing and electrically connected with the processor, wherein the touchpad module comprises: a touch member disposed within an opening formed by a first lateral wall, an opposite second lateral wall, and side lateral walls of the fixing frame, wherein the touch member comprises a recess, and the recess comprises a first end and a second end, which are opposed to each other; and an elastic member installed in the casing, and comprising a first elastic part, a second elastic part and an intermediate part between the first elastic part and the second elastic part, wherein a portion of the first elastic part and a portion of the second elastic part are extended into one of the side lateral walls of the fixing frame, and contacted with the first end and the second end of the recess, respectively, wherein when the touch member is moved from an initial position to a first position in a direction toward a first lateral wall of the fixing frame in response to an external force, the computing device executes a first function, wherein while the touch member is moved to the first position, the first elastic part is pushed by the first end of the recess, so that the first elastic part is moved toward the second elastic part.

\* \* \* \* \*